United States Patent [19]

Schenk

[11] 3,922,332

[45] Nov. 25, 1975

[54] MANUFACTURE OF FREE-FLOWING INORGANIC AMMONIUM OR POTASSIUM SALTS

[75] Inventor: Walter Schenk, Bad Duerkheim, Germany

[73] Assignee: Badische Anilin- & Soda-Fabrik Aktiengesellschaft, Ludwigshafen (Rhine), Germany

[22] Filed: Mar. 6, 1973

[21] Appl. No.: 338,552

[30] Foreign Application Priority Data

Mar. 7, 1972 Germany............................ 2210798

[52] U.S. Cl. ................ 423/268; 423/267; 423/395; 423/499; 423/545; 252/384
[51] Int. Cl. ........ C01c 1/24; C01d 3/26; C01d 9/20
[58] Field of Search ........... 423/267, 268, 499, 395, 423/545; 252/383, 384

[56] References Cited
FOREIGN PATENTS OR APPLICATIONS
38-185   1/1963   Japan.................................. 252/383

*Primary Examiner*—Edward Stern
*Attorney, Agent, or Firm*—Johnston, Keil, Thompson & Shurtleff

[57] ABSTRACT

Free-flowing inorganic ammonium or potassium salts are produced by adding to said salts a mixture of half-esters of sulfuric acid with isomeric nonanols. The salts can be handled (metered, stored, shipped) in an advantageous manner and may be used in a wide range of applications, for example for drying and catalytic purposes and for use as additives to animal feeds.

14 Claims, No Drawings

MANUFACTURE OF FREE-FLOWING INORGANIC AMMONIUM OR POTASSIUM SALTS

This invention relates to a process for the manufacture of free-flowing inorganic ammonium or potassium salts by adding to said salts a mixture of half-esters of sulfuric acid with isomeric nonanols.

It is well known that a wide range of materials, particularly hygroscopic compounds and salts such as ammonium salts and potassium salts, frequently suffer physical change when shipped or stored (Ullmanns Encyklopaedie der technischen Chemie, Vol. 6, pp. 171–172; Chemistry and Industry 1966, pp. 844–850). They go hard, cake together and completely or partially lose their loose consistency and thus their flowability, and they agglomerate and become lumpy during shipment and form encrustations on the walls of tubes and vessels, or they deliquesce. Their usefulness is thus greatly reduced and they cannot be conveyed without difficulty or metered evenly, they stop up the conveying means and are difficult to store. Thus they cause stoppages and waste. They are not strewable and are therefore useless as, say, fertilizers. The loss of flowability has a number of causes. For example, individual grains of salt adhere together due to the hygroscopic nature of the salt and to variations in temperature and/or humidity leading to alternating absorption and desorption of water. An unfavorable crystal shape or a certain content of solvent of water assists the formation of absorbates and thus promotes agglomeration. Grain plasticity and the dynamic pressure acting on lower layers of salt when large amounts of salt are piled above them also cause caking of the salt. The more finely divided salts have a larger total grain surface area, which increases their proneness to caking and thus their tendency to lose their flowability. For information on the behavior of hygroscopic and agglomeration-prone substances and on the factors determining flowability reference is made to Ullmanns Encyklopaedie der technischen Chemie, Vol. 1, pp. 564 et seq. and Houben-Weyl, Methoden der organischen Chemie, Vol. 1/2, pp. 9 et seq.

The salts are frequently used in the form of aqueous solutions, but it is also particularly advantageous for economical reasons, for example reduction of transport costs, or by reason of subsequent use e.g. as catalysts, strewable fertilizers or additives to animal feeds, to provide such materials in solid form, particularly in the form of powders showing a moderate to high degree of subdivision. A method frequently used to avoid the above drawbacks is simply to dilute the agglomeration-prone substance with a suitable non-hygroscopic material such as cork meal, silica flour and silica sand. To achieve this end, however, it is usually necessary to use relatively large quantities of the diluent in finely divided form and the method involves an often undesirable reduction in the concentration of the salt and uneconomical operating techniques. Additional operations such as thorough drying of the salts, crushing operations to break up lumpy salts, operations for selecting portions of low water content or uniform particle size, granulating operations for achieving specific grain sizes, and separation of dust portions of the salt are also unsatisfactory, since the resulting procedure is uneconomical and lacks simplicity. All crushing operations produce dust portions which tend to hamper the process of welding plastics sacks.

A number of additives for improving or stabilizing the flowability properties (anti-agglomerants) has been proposed, including for example kieselguhr, waxes, oils, water-binding agents such as calcium sulfate, calcium phosphate, aluminum silicates, magnesium fluoride and silica gel, surface-active agents such as alkylaryl sulfonates, sulfonated triarylmethane amino compounds (Ullmann, loc. cit., Vol. 6, p. 172; U.K. Pat. No. 951,960), cyanides, ferrocyanides, cadmium salts, lead salts, cerium salts, tungsten salts, phosphates, alginates, polyvinyl alcohols and polyvinyl acetates (Brit. Chem. Engng., Vol. 11, 1966, pp. 34–38). None of these materials has a sufficiently selective action on ammonia salts and potassium salts, particularly the salts ammonium sulfate, potassium chloride and potassium nitrate which form important fertilizers. Despite said additions, these salts lose their flowability to an unsatisfactory degree when stored for relatively long periods. In some cases, the salts become undesirably discolored.

The object of the invention is to provide a novel process for the manufacture of loose ammonium salt and potassium salt powders of improved free-flowing properties.

We have found that free-flowing inorganic ammonium salts or potassium salts may be advantageously obtained when from 0.00005 to 0.02% w/w of a mixture of half-esters of sulfuric acid with isomeric nonanols, based on the inorganic salt, is added thereto.

The invention is based on the observation that those ammonium and potassium salts which are also important fertilizers require selective anti-agglomerants in order to maintain (or improve) their flowability and strewability over long periods of storage and transport, without the above difficulties occurring. For example, an anti-agglomerant showing good results on sodium salts cannot necessarily be expected to give similar results on potassium salts. The process of the invention produces ammonium and potassium salts of looser consistency and of better flowability and strewability than those provided by prior art processes, and their free-flowing properties last over periods of storage and transport at least from 2 to 3 times as long as in the case of corresponding salts made by prior art processes.

The additives of the invention are particularly selective in the case of ammonium sulfate, potassium chloride and potassium nitrate. They may also be used on ammonium and potassium salts such as ammonium nitrate, ammonium chloride, potassium sulfate, the corresponding mono-, di- and tri-phosphates of ammonium and/or potassium, bisulfates such as potassium bisulfate, carbonates and bicarbonates such as potassium bicarbonate and ammonium carbonate, potassium tetrafluoroborate, ammonium bromide, potassium borate, potassium chlorate, potassium perchlorate, potassium fluoride, potassium iodide, potassium permanganate, potassium sulfite, potassium thiosulfate, potassium sulfide and ammonium nitrite and mixtures thereof.

The anti-agglomerant is preferably used in a quantity of from 0.0001 to 0.02 and more preferably in an amount of from 0.0002 to 0.02% by weight, based on the weight of the inorganic salt. It is advantageous to add at least 4 and preferably from 6 to 10 and in particular from 7 to 9 half-esters of sulfuric acid each with a different isomeric nonanol. The nonanols or isomeric nonanol mixtures may be prepared in known manner, for example by the process described in Ullmanns Encyklopaedie der technischen Chemie, Vol. 3, pp. 289 et seq. Examples of suitable isomeric nonanols are 2,4,4-trimethylhexanol-2, 3,5,5-trimethylhexanol-1, 2,4,4-trimethylhexanol-1, 4,5,5-trimethylhexanol-1, 3,4,5-trimethylhexanol-1, 2,4,5-trimethylhexanol-1, 5,6-dimethylheptanol-1, 2-ethylheptanol-1, nonanol-1, nonanol-2, nonanol-3, nonanol-4, nonanol-5, 3,5-dimethylheptanol-4, 2,6-dimethylheptanol-4, 2,4,4-trimethylhexanol-2 and 3-ethylheptanol-3. The isomers are generally present in equal amounts or one or more of the isomers may be present in an amount of up to 250% larger or smaller than said equal amount. For example, a mixture of 8 different isomeric half-esters advantageously contains each nonanol component in an amount of from 4 to 30%, based on the total mixture of nonanols. In the nonanol mixture there may be present, in addition to said half-esters, other materials such as non-esterified nonanols, alkanols of various carbon numbers, diesters of sulfuric acid with alkanols and half-esters of sulfuric acid with alkanols differing from the nonanols, as occur, for example, as by-products produced on account of the method of manufacturing said mixtures. In general, the amount of such by-products is not more than 3%, based on the mixture of half-esters.

We prefer to use mixtures of half-esters of sulfuric acid with 3,5,5-trimethylhexanol-1, 4,5,5-trimethylhexanol-1, 3,4,5-trimethylhexanol-1, 2,4,5-trimethylhexano-1, 5,6-dimethylheptanol-1 and 2-ethylheptanol-1. When using such mixtures, it is advantageous to employ from 15 to 22% and preferably from 16 to 19% of 3,5,5-trimethylhexanol-1, from 15 to 30% and preferably from 19 to 24% of 4,5,5-trimethylhexanol-1, from 25 to 40% and preferably from 29 to 36% of 3,4,5-trimethylhexanol-1, from 9 to 18% and preferably from 12 to 16% of 2,4,5-trimethylhexanol-1, from 5 to 10% and preferably from 6 to 8% of 5,6-dimethylheptanol-1 and from 4 to 8% and preferably from 5 to 7% of 2-ethylheptanol-1, by weight of the weight of the mixture of said isomeric nonanols. Such mixtures, which have a particularly selective action of the flowability of the above salts, may be advantageously manufactured as follows: The starting material used is a mixture of isomeric octenes such as is formed in the cracking of petroleum or as can be made by any of the known processes (cf. Ullmann, loc. cit., Vol. 10, pp. 40 et seq.). This mixture is then subjected to hydroformylation in known manner (Ullmann, loc. cit., Vol. 13, pp. 60 et seq.) followed by hydrogenation of the resulting aldehyde mixture. The mixture of isomeric nonanols thus formed is then subjected to sulfation, conveniently with sulfur trioxide, chlorosulfonic acid or sulfuric acid, to form a mixture of isomeric half-esters of sulfuric acid (Ullmann, loc. cit., Vol. 18, pp. 319 et seq.).

The anti-agglomerant is incorporated into the said salt, usually by impregnation, for example by immersing the salt in a suitable solution or dispersion or by spraying the salt therewith. The said solution or dispersion of the half-ester mixture is prepared using inert solvent, conveniently water but also, if desired, alkanols such as ethanol and methanol, aromatic hydrocarbons such as toluene and the xylenes, and appropriate solvent mixtures. The salt may be sprayed in a number of steps using solutions or suspensions exhibiting low contents of the half-ester mixture or in a single operation using a solution or suspension containing all of the half-ester mixture required.

The amount of solvent or continuous phase is generally from 5 to 100 times and preferably from 20 to 50 times the weight of half-ester mixture used. Impregnation is usually carried out at a temperature of from 10° to 150°C and preferably from 70° to 120°C.

Following impregnation with the anti-agglomerant, the salt thus laden is dried, for example in a rotary drier, spray drier, through-circulation drier or flash drier, generally at a temperature of from 50° to 200°C depending on the desired residual moisture content of the material. If desired, the salt may then be comminuted in any convenient manner, for example in a pin mill or screening equipment. Drying and milling may be combined in a single operation, for example by passing the salt through a mill drier (e.g., an attritor mill). Depending on the purpose to which the salt is to be put, other operations, for example blending with other materials, may follow the above operations or be combined with them. The process and processing operations may be carried out batchwise or continuously and at atmospheric or elevated pressures. The free-flowing salts produced by the process of the invention generally show particle sizes of from 0.1 to 3.5 mm.

It is also possible to add the above solutions or suspensions of the anti-agglomerant to the crystallization solution of the said salts at temperatures of, say, from 25° to 110°C, this being an economical procedure. The crystallizing salt from the solution and that obtained by evaporating the mother liquor may, if necessary, be dried in the manner described above and then directly processed in a manner determined by its ultimate purpose, for example converted to fertilizer granules. This procedure is also advantageous in the case of salts occurring or processed as by-products. Ammonium sulfate occurring in the synthesis of caprolactam and possibly still containing impurities is conveniently treated with the mixture in the above manner without further purification. The anti-agglomerant does not interfere with the crystallization. It is equally possible to add the anti-agglomerant to the hot salt or to the moist or dry salt.

The hygroscopic properties of the salts are not substantially affected by the above operations. Thus the free-flowing salts produced by the process of the invention can absorb relatively large amounts of water, e.g., from 0.01 to 3% w/w, without suffering any loss of flowability. They show no tendency to stick, become greasy, form lumps or cake together, and the absorbed water does not exude from the crystals over long periods of storage or during humidity changes. Neither is this advantageous behavior affected by comminuting operations.

The free-flowing, strewable salts manufactured by the process of the invention can be handled, e.g., metered, stored and shipped, in an advantageous manner and may be used in a wide range of applications, for example for drying and catalytic purposes and for use as additives to animal feeds. They may have a high content of fine portions of salt. Due to the good wetting action of the anti-agglomerant, the salts are dissolved more quickly, more completely and more uniformly when subsequently used. Furthermore, the anti-agglomerant affords certain protection to metals such as iron against corrosive attack by the salts.

In the following Examples the parts are by weight.

EXAMPLE 1

100 parts of ammonium sulfate (0.04% w/w moisture content) are sprayed at 90°C with a 5% aqueous solution containing 0.01 part of a half-ester mixture with vigorous stirring. The composition of the mixture is 18.5% of 3,5,5-trimethylhexanol-1, 23.5% of 4,5,5-trimethylhexanol-1, 35.8% of 3,4,5-trimethylhexanol-1, 14.8% of 2,4,5-trimethylhexanol-1 and 2.9% of 2-ethylheptanol-1, by weight of the total weight of nonanols. After cooling to about 25°C, the treated salt remains completely free-flowing when stored in a silo for 3 months. It presents no mechanical problems on discharge from the silo. An untreated salt stored under the same conditions and having the same moisture content cakes to a coherent mass which has to be broken up before the salt can be used.

The salt prepared by the process of the invention is not dust-forming and dissolves in water more quickly due to the wetting action of the anti-agglomerant used. Furthermore, it affords anticorrosive protection to metals which come into contact with the salt.

EXAMPLE 2

A laboratory test method for determining the anti-agglomerating action comprises a centrifuging technique in which ammonium sulfate samples for the same source are spun in a centrifuge at a specific speed of rotation together with a small steel piston embedded in the salt, tests being carried out with and without anti-agglomerant. It is thus possible to apply a preselected constant pressure to each sample with the aid of centrifugal force, which pressure corresponds to the conditions prevailing during storage, the test period being shortened by selecting comparatively high pressures. For example, at a speed of 2,000 rpm over a centrifuging time of 2 hours, the pressure applied to the salt mixture by the piston is 11.5 kg/cm$^2$, this being equivalent to the pressure applied by a column of salt approx. 65 m high, during storage. On completion of the centrifuging test, the steel piston is removed from the salt, the force required for this purpose being measured. In the following Table, the values given are averages taken from 2 or 3 measurements. Higher forces indicate lower flowability of the salt.

The test samples were prepared by applying the test substances in aqueous solution containing 0.015% w/w of anti-agglomerant (based on the salt) to the ammonium sulfate samples in the manner described in Example 1 and drying the mixture to a moisture content of 0.05%.

TABLE

| Sample | Anti-agglomerant | Force required to remove the piston, i.e. anti-agglomerating action |
| --- | --- | --- |
| 1 | half-ester mixture of Example 1 | 587 g |
| Comparative samples | | |
| 2 | none | 6,095 g |
| 3 | sodium oleylalcoholsulfate | 1,447 g |
| 4 | sodium dodecylbenzenesulfonate | 3,200 g |
| 5 | sodium dibutylnaphthalenesulfonate | 2,275 g |
| 6 | sodium $C_{12-18}$-alkanesulfonate | 3,980 g |
| 7 | oleic dibutylamide | 3,254 g |

EXAMPLE 3

1,000 parts of potassium chloride containing 2% w/w of rock salt and showing a tendency to cake on standing in air are mixed with 0.005 part of half-ester mixture as described in Example 1 in a mixer. To assist blending, the half-ester mixture is previously mixed with 0.5 part of potassium chloride. The treated salt mixture shows virtually the same free-flowing properties and no tendency to cake together after storage for 4 weeks in sacks subjected to a load of 1,000 parts.

I claim:

1. A process for the manufacture of a free-flowing inorganic ammonium or potassium salt, said process comprising adding to said inorganic salt as an anti-agglomerant a mixture of at least 4 half-esters of sulfuric acid each with a different isomeric nonanol in an amount of from 0.00005 to 0.02% by weight of said mixture of half-esters with reference to the weight of said salt.

2. A process as claimed in claim 1, wherein said mixture of half-esters is added to ammonium sulfate, potassium chloride or potassium nitrate.

3. A process as claimed in claim 1, wherein the anti-agglomerant mixture of half-esters is added to the inorganic salt in an amount of from 0.0001 to 0.02% by weight with reference to the weight of said salt.

4. A process as claimed in claim 1, wherein a mixture of from 6 to 10 half-esters of sulfuric acid with different isomeric nonanols is added.

5. A process as claimed in claim 1, wherein a mixture of 8 isomeric half-esters is added, in which each nonanol component is present in an amount of from 4 to 30% w/w, based on the total weight of nonanols.

6. A process as claimed in claim 1, wherein there is added a mixture of half-esters of sulfuric acid with from 15–22% of 3,5,5-trimethylhexanol-1, from 15–30% of 4,5,5-trimethylhexanol-1, from 25–40% of 3,4,5-trimethylhexanol-1, from 9–18% of 2,4,5-trimethylhexanol-1, from 5 to 10% of 5,6-dimethylheptanol-1 and from 4 to 8% of 2-ethylheptanol-1, by weight of the total weight of the mixture of isomeric nonanols.

7. A process as claimed in claim 1, wherein a mixture is added which has been obtained from a mixture of isomeric octenes by subjecting the same to hydroformylation followed by hydrogenation of the aldehyde mixture formed and sulfation of the resulting mixture of isomeric nonanols with sulfur trioxide, chlorosulfonic acid or sulfuric acid to form a mixture of isomeric sulfuric acid half-esters.

8. A free-flowing salt composition consisting essentially of:
a. an inorganic potassium or ammonium salt, and
b. as an anti-agglomerant, about 0.00005 to 0.02% by weight of said salt of a mixture of at least 4 half-esters of sulfuric acid each with a different isomeric nonanol.

9. A composition as claimed in claim 8 wherein said salt (a) is ammonium sulfate, potassium chloride or potassium nitrate.

10. A composition as claimed in claim 8 wherein said anti-agglomerant is a mixture of sulfuric acid half-esters of from 6 to 10 different isomeric nonanols.

11. A composition as claimed in claim 8 wherein said anti-agglomerant is a mixture of sulfuric acid half-esters of the following different isomeric nonanols:
   1. 15–22% of 3,5,5-trimethylhexanol-1;
   2. 15–30% of 4,5,5-trimethylhexanol-1;
   3. 25–40% of 3,4,5-trimethylhexanol-1;
   4. 9–18% of 2,4,5-trimethylhexanol-1;
   5. 5–10% of 5,6-dimethylheptanol-1; and
   6. 4–8% of 2-ethylheptanol-1, all percentages being by weight with reference to the total weight of isomeric nonanols.

12. A composition as claimed in claim 11 wherein said salt (a) is ammonium sulfate, potassium chloride or potassium nitrate.

13. A composition as claimed in claim 8 wherein said anti-agglomerant is the mixture of sulfuric acid half-esters of different isomeric nonanols obtained by subjecting a mixture of isomeric octenes to hydroformylation followed by hydrogenation of the aldehyde mixture formed and sulfation of the resulting mixture of isomeric nonanols with sulfur trioxide, chlorosulfonic acid or sulfuric acid.

14. A composition as claimed in claim 13 wherein said salt (a) is ammonium sulfate, potassium chloride or potassium nitrate.

* * * * *